United States Patent [19]
Imahashi et al.

[11] Patent Number: 6,130,282
[45] Date of Patent: Oct. 10, 2000

[54] FLAME RETARDANT RESIN COMPOSITION

[75] Inventors: Takeshi Imahashi; Keiko Katsuki; Noriko Iijima; Makoto Yoshii, all of Sakaide, Japan

[73] Assignee: Kyowa Chemical Industry Co Ltd, Kagawa, Japan

[21] Appl. No.: 09/162,156

[22] Filed: Sep. 29, 1998

[30] Foreign Application Priority Data

Oct. 1, 1997 [JP] Japan .................................. 9-268451

[51] Int. Cl.[7] .............................. C08K 3/22; C08K 3/32; C08K 3/04
[52] U.S. Cl. .......................... 524/436; 524/437; 524/216; 524/414; 524/495; 523/205
[58] Field of Search ..................... 524/436, 437, 524/414, 495; 523/205

[56] References Cited

U.S. PATENT DOCUMENTS 4,147,690 4/1979 Rich .

FOREIGN PATENT DOCUMENTS

| | | |
|---|---|---|
| 0780425 | 6/1997 | European Pat. Off. . |
| 5419018 | 1/1977 | Japan . |
| 548499 | 5/1977 | Japan . |
| 546057 | 7/1977 | Japan . |
| 52-121058 | 10/1977 | Japan . |
| 54-26837 | 2/1979 | Japan . |
| 54-64545 | 5/1979 | Japan . |
| 61-168644 | 7/1986 | Japan . |
| 62-131052 | 6/1987 | Japan . |
| 63-159473 | 2/1988 | Japan . |
| 2540354 | 9/1989 | Japan . |
| 2585052 | 9/1989 | Japan . |
| 255746 | 2/1990 | Japan . |
| 2265969 | 10/1990 | Japan . |
| 60-009831 | 1/1994 | Japan . |
| 8259224 | 10/1996 | Japan . |

*Primary Examiner*—Tae Yoon

[57] ABSTRACT

A flame retardant resin composition comprising (A) 100 parts by weight of a synthetic resin, (B) 20 to 150 parts by weight of magnesium hydroxide particles and (C) 20 to 150 parts by weight of aluminum hydroxide particles, wherein the magnesium hydroxide particles and the aluminum hydroxide particles satisfy the following conditions (i) to (v): (i) the average secondary particle diameter measured by a microtrack method is 0.4 to 4 $\mu$m; (ii) the specific surface measured by a BET method is 1 to 15 $m^2/g$; (iii) the total content of an iron compound and a manganese compound is 200 ppm or less in terms of metals (Fe+Mn); (iv) the ratio of the specific surface measured by the BET method to the specific surface measured by a Blaine method is 1 to 4; and (v) the content of a water-soluble sodium salt is 500 ppm or less in terms of metal sodium. The present invention provide a halogen-free flame retardant resin composition which has excellent thermal stability, acid resistance, water-resistant insulating properties, mechanical strength and surface appearance and is economically advantageous, and a molded article therefrom.

20 Claims, No Drawings

FLAME RETARDANT RESIN COMPOSITION

The present invention relates to a flame retardant resin composition containing no halogen compound as a flame retardant and to a molded article formed therefrom. More specifically, it relates to a flame retardant resin composition which contains a combination of magnesium hydroxide particles and aluminum hydroxide particles having each specific properties and has excellent thermal stability, acid resistance and water-resistant insulating properties and to a molded article therefrom.

In recent years, many flame retarding technologies using magnesium hydroxide particles and aluminum hydroxide particles as safe flame retardants have been proposed as a substitute for flame retarding technologies typified by a technology using both a harmful halogen-based flame retardant and antimony trioxide.

However, these technologies do not provide solutions to such problems as thermal stability, acid resistance, water-resistant insulating properties, mechanical strength, surface appearance, silver streaking at the time of injection molding and economy as will be described hereinafter and do not replace the flame retarding technology using a halogen-based flame retardant and antimony trioxide sufficiently though they are rated as a safe flame retardant.

The technology for providing a resin with flame retardancy using a halogen-based flame retardant and antimony trioxide in combination is being substituted by a technology using magnesium hydroxide particles and aluminum hydroxide particles as safe flame retardants little by little because the former technology has problems in that it corrodes a processing machine at the time of processing generates harmful gas or corrosive gas and a large amount of black smoke at the combustion or causes a problem in toxicity when the resin is buried as waste after use.

The magnesium hydroxide particles are used as a flame retardant for synthetic resins because they have a decomposition start temperature of about 340° C. and are a safe flame retardant. However, as the magnesium hydroxide particles are an alkaline substance, they have poor acid resistance. For example, when a resin composition containing a large amount of the magnesium hydroxide particles is exposed to carbonic acid-containing water or acidic rain for a long time, magnesium carbonate particles, basic magnesium carbonate particles or the like precipitate out on the surface with the result that the surface is covered with white powder and the appearance of a molded article is impaired.

For instance, JP-A 2-55746 (the term "JP-A" as used herein means an "unexamined published Japanese patent application"), JP-A 8-259224 and JP-C 2585052 (the term "JP-C" as used herein means an "granted Japanese patent gazette") and JP-C 2540354 propose a technology for solving the above problem of white powdering. However, according to studies conducted by the inventors of the present invention, it has been found that the white powdering problem cannot be solved even by the above technology completely in many cases.

For instance, to obtain V-0 flame retardancy according to the flame retardant rating of the UL94VE method for $\frac{1}{12}$-inch and $\frac{1}{16}$-inch thick sheets which are frequently used for flame retarding polypropylene articles, magnesium hydroxide particles must be added in an amount of 180 parts or more by weight for a $\frac{1}{12}$-inch thick sheet and 200 parts or more by weight for a $\frac{1}{16}$-inch thick sheet, based on 100 parts by weight of polypropylene. It has been found that white powdering cannot be prevented by the above technology alone in such a case of the composition containing a large amount of the magnesium hydroxide particles.

The thermal stability of a synthetic resin lowers simply when the magnesium hydroxide particles are contained in the synthetic resin. According to studies conducted by the present inventors, it has been found that, if a compound of a heavy metal such as iron or manganese is contained in the magnesium hydroxide particles as an impurity, the thermal deterioration of the resin is further promoted even when it is contained not only as an impurity but also as a solid solution.

When the price of the magnesium hydroxide particles is compared with the price of the aluminum hydroxide particles for application as a flame retardant, the magnesium hydroxide particles are much more expensive than the aluminum hydroxide particles and hence, it is not economical to use a large amount of the magnesium hydroxide particles.

The aluminum hydroxide particles are an inexpensive and useful flame retardant having excellent acid resistance. However, when the aluminum hydroxide particles are contained in the synthetic resin as a flame retardant, the thermal stability of the resulting synthetic resin becomes much lower than when the magnesium hydroxide particles are contained. Further, when only the aluminum hydroxide particles are used in a synthetic resin which can be infection molded at about 170 to 195° C., silver streaking occurs remarkably on the surface of a molded article.

When the magnesium hydroxide particles or the aluminum hydroxide particles is contained in a synthetic resin, the thermal stability of the resulting synthetic resin lowers as described above. However, it has been found by studies conducted by the present inventors that, when compounds of not only Fe and Mn but also other heavy metals such as Cu, Co, Cr, V and Ni are contained in the magnesium hydroxide particles or the aluminum hydroxide particles even in small quantities as impurities or solid solutions, the thermal stability of the synthetic resin further lowers.

A water-soluble sodium salt may be sometimes contained in the magnesium hydroxide particles or the aluminum hydroxide particles as a flame retardant, which is ascribed to a production process. When the water-soluble sodium salt is contained in the magnesium hydroxide particles or the aluminum hydroxide particles in an amount of about 500 ppm or more in terms of Na, the water-resistant insulating properties of the resulting resin composition are greatly lowered and the acid resistance (white powdering of the surface of a molded article) thereof is also further lowered at the same time.

As technologies for providing a synthetic resin with flame retardancy, technologies which make use of metal hydroxides such as magnesium hydroxide particles and aluminum hydroxide particles are disclosed by JP-B 54-6057 (the term "JP-B" as used herein means an "examined Japanese patent publication"), JP-B 54-19018, JP-B 54-8499, JP-A 54-26837, JP-A 54-64545, JP-A 62-131052, JP-A 63-159473, JP-A 61-168644, JP-A 2-265969, JP-A 52-121058 and the like.

However, there are no technologies which use a combination of magnesium hydroxide particles and aluminum hydroxide particles which satisfy all of average secondary particle diameter, specific surface measured by a BET method, contents of heavy metal compounds such as an iron compound and manganese compound, content of Na in a water-soluble sodium salt and ratio of the specific surface measured by the BET method to the specific surface measured by the Blaine method, all essential requirements for the magnesium hydroxide particles and the aluminum hydroxide particles used as specified in the present invention.

Of the above examined patent publications and unexamined patent applications, JP-B 54-6057 and JP-A 52-121058 disclose resin compositions which comprise both magnesium hydroxide particles and aluminum hydroxide particles.

However, JP-B 54-6057 fails to specify magnesium hydroxide particles and aluminum hydroxide particles, and though JP-A 54-121058 specifies the particle diameter of the aluminum hydroxide particles as 20 to 100 µm and that of the magnesium hydroxide particles as 40 to 150 µm, it fails to specify other requirements for these particles.

All of the above examined patent publications and unexamined patent applications fail to describe the thermal stability, acid resistance and water-resistant insulating properties of a molded article obtained when both magnesium hydroxide particles and aluminum hydroxide particles are used and silver streaking when the resin composition is injection molded.

JP-B 54-6057 proposes a thermoplastic resin composition which comprises a metal hydroxide mixture of aluminum hydroxide particles and magnesium hydroxide particles in an amount of 40 wt % or more based on a thermoplastic resin and calcium oxide particles in an amount of 10 parts or less by weight based on 100 parts by weight of the thermoplastic resin composition having the above composition. However, as described above, this publication has problems with the average secondary particle diameters of aluminum hydroxide particles and magnesium hydroxide particles, specific surface measured by the BET method, the contents of heavy metal compounds such as Fe and Mn, the content of Na in a water-soluble sodium salt, and the ratio of the specific surface measured by the BET method to the specific surface measured by the Blaine method but is utterly silent about these problems.

To further improve flame retardancy, the above proposal recommends that calcium oxide particles should be mixed with the thermoplastic resin, but the mixing of calcium oxide particles involves the following problem. Calcium oxide particles have higher solubility in water than magnesium hydroxide particles. When a molded article of a resin composition comprising such calcium oxide particles is left in a humid place or in water for a long time, the calcium oxide particles react with a carbonate group present in the air or water to become calcium carbonate or basic calcium carbonate which precipitates out on the surface of the molded article and impairs the appearance of the molded article.

JP-A 52-121058 proposes a resin composition which comprises a thermoplastic resin essentially composed of polypropylene and magnesium hydroxide particles and aluminum hydroxide particles and has excellent water-resistant insulating properties and also a resin composition prepared by adding a fatty acid having 14 to 18 carbon atoms or a metal salt of the group II or III thereof to the resin composition so as to further improve water-resistant insulating properties. However, the particle diameters of the magnesium hydroxide particles and the aluminum hydroxide particles used are very large in the proposals and there is no description of other properties and characteristic features of these particles.

As described above, since the conventional technologies for providing a synthetic resin with flame retardancy using both magnesium hydroxide particles and aluminum hydroxide particles do not use fully specified magnesium hydroxide and aluminum hydroxide, they have problems with one or more of thermal stability, acid resistance, water-resistant insulating properties, mechanical strength, surface appearance, silver streaking, economy and the like. A technology giving an overall solution to these problems has not been developed yet.

It is an object of the present invention to provide a technology for providing a synthetic resin with flame retardancy using both magnesium hydroxide particles and aluminum hydroxide particles, which satisfy respectively all requirements for thermal stability, acid resistance, water-resistant insulating properties, mechanical strength, surface appearance, silver streaking and economy.

According to the present invention, it has been found that the above object of the present invention can be attained by a flame retardant resin composition which consists essentially of (A) 100 parts by weight of a synthetic resin, (B) 20 to 150 parts by weight of magnesium hydroxide particles and (C) 20 to 150 parts by weight of aluminum hydroxide particles, wherein the magnesium hydroxide particles and the aluminum hydroxide particles satisfy the following conditions (i) to (v), respectively:

(i) the average secondary particle diameter measured by a microtrack method is 0.4 to 4 µm;

(ii) the specific surface measured by a BET method is 1 to 15 $m^2/g$;

(iii) the total content of an iron compound and a manganese compound is 200 ppm or less in terms of metals [Fe+Mn];

(iv) the ratio of the specific surface measured by the BET method to the specific surface measured by a Blaine method is 1 to 4; and (v) the content of a water-soluble sodium salt is 500 ppm or less in terms of metal sodium.

In the present invention, the above object is attained by using a combination of two different types of particles, that is, magnesium hydroxide particles and aluminum hydroxide particles, both of which satisfy the above requirements (i) to (v), and the object can not be attained when these different types of particles are used alone.

The present invention will be described in detail hereinunder.

Both of the magnesium hydroxide particles and the aluminum hydroxide particles in the present invention have an average secondary particle diameter measured by the microtrack method of 0.4 to 4 µm, preferably 0.6 to 1.5 µm, a specific surface measured by the BET method of 1 to 15 $m^2/g$, preferably 3 to 10 $m^2/g$, a ratio of the specific surface measured by the BET method to the specific surface measured by the Blaine method of 1 to 4, referably 1 to 3, and those containing almost no or a small amount of secondary particles are used to maintain excellent mechanical strength and surface appearance of a molded article.

The total amount of an iron compound and a manganese compound contained in the magnesium hydroxide particles and the aluminum hydroxide particles of the present invention as impurities is 200 ppm or less, preferably 100 ppm or less in terms of metals [Fe+Mn], respectively.

As described above the magnesium hydroxide particles and the aluminum hydroxide particles of the present invention contain impurities in the above range in terms of metals [Fe+Mn]. More preferably, the total content of heavy metal compounds including a cobalt compound, chromium compound, copper compound, vanadium compound and nickel compound in the magnesium hydroxide particles and the aluminum hydroxide particles is also in the above range in terms of metals. That is, it is more advantageous that the magnesium hydroxide particles and the aluminum hydroxide particles should have a total content of Fe+Mn+Co+Cr+

Cu+V+Ni of 200 ppm or less, preferably 100 ppm or less in terms of metals.

The magnesium hydroxide particles and the aluminum hydroxide particles having a content of a water-soluble sodium salt as an impurity of 500 ppm or less, preferably 300 ppm or less and particularly preferably 100 ppm or less in terms of Na are used to maintain excellent water-resistant insulating properties and acid resistance of a molded article.

When the content of a water-soluble sodium salt in the magnesium hydroxide particles and the aluminum hydroxide particles used in the present invention is beyond the above range, it can be reduced by the following means. That is, before synthesized particles or surface treated particles are dried, they are fully dehydrated or washed with water after dehydration and dried to obtain particles having a small content of a sodium salt. The dehydration and washing with water can be carried out once or several times.

The magnesium hydroxide particles and the aluminum hydroxide particles of the present invention can be added to the resin directly as flame retardants or treated with a surface treating agent. The surface treating agent is at least one member selected from the group consisting of higher fatty acids, coupling agents (silane-, titanate- and aluminum-based), alcohol phosphoric esters. These surface treating agents are used in an amount of 10 wt % or less, preferably 5 wt % or less for one or both of the magnesium hydroxide particles and the aluminum hydroxide particles.

Preferred examples of the surface treating agent include higher fatty acids having 10 or more carbon atoms such as stearic acid, erucic acid, palmitic acid, lauric acid and behenic acid; alkali metal salts of these higher fatty acids; phosphoric esters of acid and alkali metal salts and amine salts of mono- and di-esters of orthophosphoric acid and oleyl alcohol or stearyl alcohol and mixtures thereof; silane coupling agents such as vinylethoxysilane, vinyl-tolyl(2-methoxy-ethoxy)silane,γ-methacryloxypropyl trimethoxysilane, γ-aminopropyl trimethoxysilane, γ-aminopropyl triethoxysilane, N-phenyl-γ-aminopropyl trimethoxysilane, N-β(aminoethyl)γ-aminopropyl trimethoxysilane, N-β(aminoethyl)γ-aminopropyl triethoxysilane, N-phenyl-γ-aminopropyl trimethoxysilane, β-(3,4-epoxycyclohexyl)ethyl trimethoxysilane, γ-glycidoxypropyl trimethoxysilane and γ-mercaptopropyl trimethoxysilane; titanate-based coupling agents such as isopropyltriisostearoyl titanate, isopropyltris(dioctylpyrophosphate)titanate, isopropyltris(N-aminoethyl-aminoethyl)titanate, isopropyltridecylbenzenesulfonyl titanate; aluminum-based coupling agents such as acetoalkoxy aluminum diisopropylate; and the like.

In the present invention, a resin composition having higher acid resistance can be obtained by using the magnesium hydroxide particle with the surface coated with at least one acid-resistant coating agent selected from the group consisting of silicon compounds, boron compounds and aluminum compounds and additionally treated with at least one surface treating agent selected from the group consisting of the above higher fatty acids, titanate coupling agents, silane coupling agents, aluminate coupling agents and alcohol phosphoric esters as required.

Illustrative examples of the acid-resistant coating agent include silicon compounds such as sodium silicates including sodium metasilicate and sodium orthosilicate, potassium silicates including potassium metasilicate and potassium orthosilicate, and water-glass; boron compounds such as sodium tetraborate, sodium metaborate, potassium tetraborate and potassium metaborate; aluminum compounds such as sodium aluminates including sodium orthoaluminate and sodium metaaluminate, potassium aluminates including potassium orthoaluminate and potassium metaaluminate, and aluminum salts of inorganic acids such as aluminum chloride, aluminum nitrate, aluminum sulfate and aluminum phosphate; and the like.

The acid resistant coating agent is coated on the magnesium hydroxide particle in an amount of 2 wt % or less. When the acid resistant coating agent is coated in an amount of more than 2 wt %, acid resistance is not improved and moreover, dehydration and filtration works after surface treatment by a wet process deteriorate. Therefore, the coating agent is preferably coated in an amount of 2 wt % or less.

The aluminum hydroxide particle does not need to be coated with the above acid resistant coating agent in the present invention because it has excellent acid resistance.

In the present invention, the magnesium hydroxide particles and the aluminum hydroxide particles are each used in an amount of 20 to 150 parts by weight, preferably 25 to 125 parts by weight based on 100 parts by weight of the synthetic resin. The total amount of the magnesium hydroxide particles and the aluminum hydroxide particles is 40 to 300 parts by weight, preferably 50 to 250 parts by weight. When the total amount of the magnesium hydroxide particles and the aluminum hydroxide particles is less than 40 parts by weight, flame retardancy is insufficient and when the total amount is more than 300 parts by weight, there may be a problem with mechanical strength.

The flame retardant composition of the present invention may contain red phosphorus powder, silicone or carbon powder as a flame retardant aid.

The red phosphorus powder are preferably stabilized red phosphorus powder which rarely generates phosphine gas at the time of kneading, molding or heating. Illustrative examples of the stabilized red phosphorus powder include thermoplastic resin-coated red phosphorus, olefin-coated red phosphorus, titanium oxide-coated red phosphorus, titan and aluminum condensate coated red phosphorus and the like.

As the carbon powder there are used carbon black, graphite or activated carbon. The carbon black is produced by an oil furnace process, gas furnace process, channel process or acetylene process.

The silicone is a silicone resin, silicone grease, silicone rubber or silicone oil.

These flame retardant aids are preferably used in an amount of 0.1 to 30 parts by weight, more preferably 0.5 to 20 parts by weight based on 100 parts by weight of the synthetic resin.

The synthetic resin to be blended with the magnesium hydroxide particles and the aluminum hydroxide particles of the present invention may be a synthetic resin which is generally used as a molded article, as exemplified by olefin (α-olefin) polymers and copolymers having 2 to 8 carbon atoms such as polyethylene, polypropylene, ethylene/propylene copolymer, polybutene and poly-4-methylpentene-1, copolymers of these olefins and diene, ethylene-acrylate copolymers, and thermoplastic resins such as polystyrene, ABS resin, AAS resin, AS resin, MBS resin, TPO resin, ethylene-vinyl acetate polymer resin, vinyl acetate resin, phenoxy resin, polyacetal, polyamide and methacrylic resin.

Further, thermosetting resins such as epoxy resin, phenol resin, melamine resin, unsaturated polyester resin, alkyd resin and urea resin, and synthetic rubber such as EPDM, butyl rubber, isoprene rubber, SBR, NIR, urethane rubber, butadiene rubber, acryl rubber and silicone rubber may also be used.

Out of these synthetic resins, particularly preferred are polyolefins and copolymers thereof having good balance among flame retarding effect, thermal stability, acid resistance, water-resistant insulating properties and mechanical strength retaining properties owing to the magnesium hydroxide particles and the aluminum hydroxide particles, as exemplified by polypropylene resins such as polypropylene homopolymer and ethylene propylene copolymer, polyethylene resins such as high-density polyethylene, low-density polyethylene, straight-chain low-density polyethylene, super low-density polyethylene, EVA (ethylene vinyl acetate resin), EEA (ethylene ethyl acrylate resin), EMA (ethylene-methyl acrylate copolymer resin), EAA (ethylene-acrylic acid copolymer resin) and super high molecular weight polyethylene; and olefin ($\alpha$-ethylene) polymers having 2 to 6 carbon atoms and copolymers thereof such as polybutene and poly-4-methylpentene-1.

The synthetic resin used in the present invention is not limited by its production process but may be produced by any of a Ziegler process, Ziegler-Natta process, metallocene process, Friedel-Craft process, Phillips process and the like according to the polyolefin polymerization catalyst.

In the composition of the present invention, the blending, kneading and molding of the synthetic resin, magnesium hydroxide particles, aluminum hydroxide particles and flame retardant aids are not particularly limited and any means of mixing, kneading and molding are acceptable if these materials can be uniformly mixed, kneaded and molded. For example, after the above components and other additives are mixed together in advance, the resulting mixture may be melt-kneaded with an open roll, single-screw or double-screw extruder, Banbury mixer or the like. The method of molding the obtained resin composition is not particularly limited and may be injection molding, extrusion molding, blow molding, press molding, rotational molding, inflation molding or the like.

A flame retardant resin molded article having excellent properties which has attained the object of the present invention is obtained by molding the flame retardant resin composition of the present invention at 200° C. or lower, preferably 170 to 195° C.

The flame retardant resin composition of the present invention may contain various additives, reinforcement, filler and the like which are generally added in limits not prejudicial to the object of the present invention. Some of them are, for example, additives, fillers and reinforcement such as an antioxidant, ultraviolet absorber, light stabilizer, thermal stabilizer, metal inactivating agent, lubricant, colorant, nucleating agent, deodorizer, lithopone, wood flour, glass fiber, fibrous magnesium hydroxide, fibrous basic magnesium sulfate, calcium silicate, alumina, glass powder, graphite, silicon carbide, silicon nitride, boron nitride, aluminum nitride, carbon fiber, graphite fiber, silicon carbide fiber and polymer alloy compatibilizing agent.

Illustrative examples of the polymer alloy compatibilizing agent include maleic anhydride modified styrene-ethylene-butylene resin, maleic anhydride modified styrene-ethylene-butadiene resin, maleic anhydride modified polyethylene, maleic anhydride modified EPR, maleic anhydride modified polypropylene, carboxyl modified polyethylene, epoxy modified polystyrene/PMMA, polystyrene-polyimide block copolymer, polystyrene-methyl polymethacrylate block copolymer, polystyrene-polyethylene block copolymer, polystyrene-ethyl acrylate graft copolymer, polystyrene-polybutadiene graft copolymer, polypropylene-ethylene-propylene-diene graft copolymer, polypropylene-polyamide graft copolymer, ethyl polyacrylate-polyamide graft copolymer and the like.

The following examples are given to further illustrate the present invention. The specific surface measured by the BET method, average secondary particle diameter, specific surface measured by the Blaine method, the analysis of a heavy metal such as Fe or Mn, the analysis of Na in a water-soluble sodium salt, and the method of measuring silver streaking will be described below.

(1) Specific surface measured by BET method;

This is measured by the Multisorb 12, a 12-specimen fully automatic surface measuring instrument manufactured by Yuasa Ionics Co., Ltd.

(2) Average secondary particle diameter;

This is measured using the microtrack of Leed & Nortrup Instruments Company.

(3) Specific surface measured by Blaine method;

This is measured in accordance with JIS R 5201-1964.

The amount of a sample based on a porosity of 0.715 for magnesium hydroxide particles and a porosity of 0.783 for aluminum hydroxide particles is measured.

(4) Analysis of Fe, Mn, Cu, Co, Cr, V and Ni;

This is measured by ICP-MS (Inductively coupled plasma-mass spectrometry) or atomic absorptiometry.

(5) Analysis of Na in water-soluble sodium salt;

Sodium eluted when 10 g of a sample of magnesium hydroxide particles and aluminum hydroxide particles is stirred in 100 ml of ion exchange water at 30° C. for 96 hours is measured by atomic absorptiometry.

(6) Acid resistance test;

The following surface whitening test is carried out as an acid resistance test.

A ⅛-inch thick test piece for a UL94VE method is completely immersed in 500 ml of ion exchange water, left at 24° C. for 48 hours while carbon dioxide gas is blown into the water and then, taken out from the water. The degree of surface whitening of the sample taken out is ranked visually based on the following five grades.

grade 1 No surface whitening phenomenon is observed.

grade 2 A faint surface whitening phenomenon is observed.

grade 3 A slight surface whitening phenomenon is observed.

grade 4 A relatively distinct surface whitening phenomenon is observed.

grade 5 A marked surface whitening phenomenon is observed over the entire surface.

Grade 3 or higher means that the test piece has practical whitening preventing properties and grade 2 or higher is especially desired.

(7) Flame retardancy;

This is measured in accordance with a UL94VE method, UL94HB method or oxygen index method (JIS K 7201).

(8) Tensile strength at yield point;

This is measured in accordance with JIS K 7113.

Polypropylene is measured at a test rate of 50 mm/min and EVA at 200 mm/min.

(9) Thermal stability;

A 1/12-inch thick polypropylene test piece according to the UL94VE method is cut in half in length by scissors and hung within a gear oven at 150° C. to check the number of days passed until the test piece is deteriorated by heat oxidization and powdered.

(10) Water-resistant insulating properties;

A square polypropylene test piece having an each side length of 10 cm and a thickness of 2 mm whose sides have been cut by scissors is immersed in ion exchange water at 95° C. for 48 hours, taken out from the ion exchange water and immersed in ion exchange water at 30° C. for 15 minutes.

Thereafter, the test piece is taken out from the water, water on the test piece is wiped off with a paper towel, and the test piece is left at 23° C.±2° C. and 50% RH for 15 minutes.

This test piece is used for the measurement of its volume resistivity with the TR8401 of Takeda Riken Kogyo Co., Ltd. under the same conditions as described above to obtain data on water-resistant insulating properties.

An EVA test piece is immersed in ion exchange water at 70° C. for 168 hours. Other test pieces are measured under the same conditions as those of the polypropylene test piece.
(11) Silver streaking on surface of molded article;

A 2.1 mm-thick and 50 mm-diameter disk is injection molded using the FS120S18ASE injection molding machine of Nissei Jushi Kogyo Co., Ltd.

The degree of silver streaking on this disk is ranked visually based on the following grades.

Silver streaking of grade 3 or higher is acceptable and grade 2 or higher is especially desirable.

grade 1 No silver streaking is observed.

grade 2 Faint silver streaking is observed near a gate.

grade 3 Slight silver streaking is observed.

grade 4 Silver streaking is observed over the entire surface.

grade 5 Marked silver streaking is observed over the entire surface.

EXAMPLES 1 TO 4 AND COMPARATIVE EXAMPLES 1 TO 13

Of magnesium hydroxide particles and aluminum hydroxide particles shown in Table 1 and Table 2, A-I, X-I, B-I and Y-I were obtained by surface treating magnesium hydroxide particles and aluminum hydroxide particles with a 3 wt % solution of sodium stearate heated at 80° C. for 30 minutes under stirring.
A-I and B-I were obtained by fully dehydrating, washing with water, drying and grinding the magnesium hydroxide particles and the aluminum hydroxide particles, respectively.
X-I and Y-I were obtained by drying the magnesium hydroxide particles and the aluminum hydroxide particles by evaporation without dehydration, respectively.
A-II, X-II, B-II and Y-II were obtained by surface treating the magnesium hydroxide particles and the aluminum hydroxide particles with a 2.5 wt % solution of a mixture of 90% of a diester represented by the following formula (1) and 10% of a monoester represented by the following formula (2) of a diethanolamine salt of stearyl phosphoric ester and heated at 80° C., respectively. After surface treatment, A-II and B-II were fully hydrated, dried and ground. X-II and Y-II were dried up by evaporation without dehydration and ground.

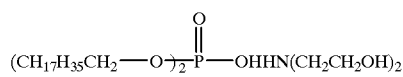
(1)

(2)

A-III and X-III were obtained by coating the surfaces with No. 3 water-glass depolymerized by 1N hydrochloric acid in an amount of 0.5 wt % in terms of $SiO_2$ in a hot water heated at 80° C.

Isopropyl triisostearoyl titanate dissolved in a triethanolamine solvent was added to this water suspension in an amount of 2 wt % based on A-III or X-III to surface treat A-III or X-III additionally. B-III and Y-III were surface treated in the same manner as in A-III and X-III except that treatment with water-glass was not carried out.

After surface treatment, A-III, X-III, B-III and Y-III were fully dehydrated to remove the solvent, washed with water, dried and ground.

The physical properties of powders after surface treatment are shown in Table 2.

Since there were changes in analytical values of Na content, average secondary particle diameter, specific surface measured by the BET method, specific surface measured by the Blaine method, the ratio of the specific surface measured by the BET method to the specific surface measured by the Blaine method, $Mg(OH)_2$ content and $Al(OH)_3$ content before and after surface treatment, these analytical values before and after surface treatment are given in Tables 1 and 2. On the other hand, since there were almost no changes in the analytical values of other items before and after surface treatment, they are not given in Tables 1 and 2.

The magnesium hydroxide particles and the aluminum hydroxide particles thus surface treated were mixed with 92 parts by weight of polypropylene of an impact resistant grade, 8 parts by weight of EVA (EVA having a VA content of 25%), 0.25 part by weight of the Irganox 1010 (of Ciba-Geigy Limited.) and 0.25 part by weight of DLTP (of Yoshitomi Pharmaceutical lndustries, Ltd.) and kneaded with a double-screw extruder at 185° C. to obtain a compound pellet. In Example 4 and Comparative Examples 11 to 13, red phosphorus powder and carbon black powder were added. These compound pellets were dried with hot air at 120° C. for 2 hours and injection molded to obtain test pieces for test items shown in Table 3 and Table 4. Tests were carried out on these test pieces.

The results are shown in Table 3 and Table 4.

In Table 3 and Table 4, a: magnesium hydroxide particles b: aluminum hydroxide particles c: red phosphorus (Nova Excel 140 of Rin Kagaku Co., Ltd.)

d: carbon black (FEF produced by the oil furnace method)

According to the test results, the test pieces of all Examples had no problems with flame retardancy, thermal stability, acid resistance, water-resistance insulating properties, tensile strength at yield point and silver streaking.

On the other hand, the test pieces of Comparative Examples had a problem in at least one of these test items.

TABLE 1

| physical properties and composition of powders | sample name magnesium hydroxide | | | | | |
|---|---|---|---|---|---|---|
| | A-I | A-II | A-III | X-I | X-II | X-III |
| before surface treatment | | | | | | |
| average secondary particle diameter ($\mu$m) | 0.93 | 1.3 | 0.61 | 4.65 | 0.94 | 0.36 |
| specific surface measured by BET method (m$^2$/g) | 5.5 | 3.1 | 9.4 | 3.8 | 13 | 25 |
| specific surface measured by Blaine method (m$^2$/g) | 3.3 | 1.5 | 3.8 | 2.2 | 3.4 | 3.3 |
| ratio of specific surface measured by BET method to specific surface measured by Blaine method | 1.7 | 2.1 | 2.5 | 1.7 | 3.8 | 7.6 |
| content of Mg(OH)$_2$ (%) | 99.75 | 99.47 | 99.80 | 93.97 | 99.62 | 99.45 |
| CaO (%) | 0.04 | 0.17 | 0.05 | 1.31 | 0.05 | 0.05 |
| CO$_2$ (%) | 0.19 | 0.15 | 0.11 | 4.15 | 0.10 | 0.10 |
| Na (%) | 0.002 | 0.002 | 0.002 | 0.02 | 0.02 | 0.100 |
| Fe (%) | 0.001 | 0.006 | 0.007 | 0.28 | 0.05 | 0.003 |
| Mn (%) | 0.001 | 0.003 | 0.002 | 0.025 | 0.02 | 0.002 |
| Cu (%) | ≦0.0001 | ≦0.0001 | ≦0.0001 | 0.006 | ≦0.0001 | ≦0.0001 |
| V (%) | ≦0.0001 | ≦0.0001 | ≦0.0001 | ≦0.0001 | ≦0.0001 | ≦0.0001 |
| Co (%) | ≦0.0001 | ≦0.0001 | ≦0.0001 | ≦0.0001 | ≦0.0001 | ≦0.0001 |
| Ni (%) | ≦0.0001 | ≦0.0001 | ≦0.0001 | 0.008 | ≦0.0001 | ≦0.0001 |
| Cr (%) | ≦0.0001 | ≦0.0001 | ≦0.0001 | 0.005 | ≦0.0001 | ≦0.0001 |

| physical properties and composition of powders | sample name aluminum hydroxide | | | | | |
|---|---|---|---|---|---|---|
| | B-I | B-II | B-III | Y-I | Y-II | Y-III |
| before surface treatment | | | | | | |
| average secondary particle diameter ($\mu$m) | 0.70 | 1.1 | 1.3 | 7.2 | 0.72 | 1.3 |
| specific surface measured by BET method (m$^2$/g) | 8.0 | 5.0 | 4.7 | 2.0 | 8.0 | 5.0 |
| specific surface measured by Blaine method (m$^2$/g) | 3.4 | 3.0 | 1.7 | 1.1 | 3.5 | 1.5 |
| ratio of specific surface measured by BET method to specific surface measured by Blaine method | 2.4 | 1.8 | 2.8 | 1.8 | 2.3 | 3.3 |
| content of Al(OH)$_3$ (%) | 99.61 | 99.70 | 99.59 | 99.65 | 99.67 | 99.68 |
| CaO (%) | ≦0.001 | ≦0.001 | ≦0.001 | ≦0.001 | ≦0.001 | ≦0.001 |
| CO$_2$ (%) | ≦0.001 | ≦0.001 | ≦0.001 | ≦0.001 | ≦0.001 | ≦0.001 |
| Na (%) | 0.005 | 0.005 | 0.005 | 0.100 | 0.100 | 0.100 |
| Fe (%) | 0.003 | 0.004 | 0.004 | 0.025 | 0.03 | 0.03 |
| Mn (%) | ≦0.001 | ≦0.001 | ≦0.001 | 0.002 | 0.002 | 0.003 |
| Cu (%) | ≦0.0001 | ≦0.0001 | ≦0.0001 | ≦0.0001 | 0.005 | 0.005 |
| V (%) | ≦0.0001 | ≦0.0001 | ≦0.0001 | ≦0.0001 | ≦0.0001 | ≦0.0001 |
| Co (%) | ≦0.0001 | ≦0.0001 | ≦0.0001 | ≦0.0001 | ≦0.0001 | ≦0.0001 |
| Ni (%) | ≦0.0001 | ≦0.0001 | ≦0.0001 | ≦0.0001 | ≦0.0001 | ≦0.0001 |
| Cr (%) | ≦0.0001 | ≦0.0001 | ≦0.0001 | ≦0.0001 | ≦0.0001 | ≦0.0001 |

TABLE 2

| physical properties and composition of powders | sample name magnesium hydroxide | | | | | |
|---|---|---|---|---|---|---|
| | A-I | A-II | A-III | X-I | X-II | X-III |
| after surface treatment | | | | | | |
| Na content (%) | 0.006 | 0.002 | 0.009 | 0.245 | 0.02 | 0.028 |
| average secondary particle diameter ($\mu$m) | 0.95 | 1.4 | 0.654.80 | 0.98 | 0.39 | |
| specific surface measured by BET method (m$^2$/g) | 5.1 | 3.0 | 9.0 | 3.5 | 12 | 23 |
| specific surface measured by Blaine method (m$^2$/g) | 3.7 | 1.9 | 4.7 | 2.7 | 3.7 | 3.9 |
| ratio of specific surface measured by BET method to specific surface measured by Blaine method | 1.4 | 1.6 | 1.9 | 1.3 | 3.2 | 5.9 |
| content of Mg(OH)$_2$ (%) | 97.15 | 97.37 | 97.60 | 90.97 | 97.53 | 97.25 |

| physical properties and composition of powders | sample name aluminum hydroxide | | | | | |
|---|---|---|---|---|---|---|
| | B-I | B-II | B-III | Y-I | Y-II | Y-III |
| after surface treatment | | | | | | |
| Na content (%) | 0.007 | 0.005 | 0.010 | 0.345 | 0.102 | 0.030 |
| average secondary particle diameter ($\mu$m) | 0.74 | 1.2 | 1.4 | 7.7 | 0.75 | 1.4 |
| specific surface measured by BET method (m$^2$/g) | 7.6 | 5.1 | 4.4 | 1.8 | 7.6 | 4.7 |

TABLE 2-continued

| | | | | | | |
|---|---|---|---|---|---|---|
| specific surface measured by Blaine method (m$^2$/g) | 3.8 | 3.6 | 2.3 | 1.5 | 3.9 | 2.0 |
| ratio of specific surface measured by BET method to specific surface measured by Blaine method | 2.0 | 1.4 | 1.9 | 1.2 | 1.9 | 2.4 |
| content of Al(OH)$_3$ (%) | 97.01 | 97.58 | 97.35 | 96.65 | 97.55 | 97.46 |

TABLE 3

| | composition (a and b are surface treated articles) parts by weight | | flame retardancy UL94 | thermal stability number of days | acid resistance grade | water-resistant insulating properties Ω · cm | tensile strength at yield point kgf/mm$^2$ | silver streaking grade |
|---|---|---|---|---|---|---|---|---|
| Ex. 1 | a: A-I | 80 | ⅛-inch VE V-0 | 35 | 1 | 1 × 10$^{15}$ | 1.95 | 1 |
| | b: B-I | 80 | | | | | | |
| C. Ex. 1 | a: A-I | 160 | V-0 | 30 | 4 | 1 × 10$^{15}$ | 1.93 | 1 |
| C. Ex. 2 | b: B-I | 160 | V-0 | 22 | 1 | 8 × 10$^{14}$ | 1.91 | 5 |
| C. Ex. 3 | a: X-I | 80 | V-0 | 2 | 4 | 1 × 10$^8$ | 1.30 | 4 |
| | b: Y-I | 80 | | | | | | |
| C. Ex. 4 | a: none | | not accepted | 110 | 1 | ≦1 × 10$^{16}$ | 2.80 | 1 |
| | b: none | | | | | | | |
| Ex. 2 | a: A-II | 95 | ¹⁄₁₂-inch VE V-0 | 30 | 1 | 5 × 10$^{14}$ | 1.80 | 1 |
| | b: B-II | 95 | | | | | | |
| C. Ex. 5 | a: X-II | 95 | V-0 | 1 | 4 | 5 × 10$^{10}$ | 1.33 | 4 |
| | b: Y-II | 95 | | | | | | |
| C. Ex. 6 | a: A-II | 190 | V-0 | 25 | 4 | 5 × 10$^{14}$ | 1.78 | 1 |
| C. Ex. 7 | b: B-II | 190 | V-0 | 17 | 1 | 2 × 10$^{14}$ | 1.75 | 5 |

Ex. = Example
C. Ex. = Comparative Example

TABLE 4

| | composition (a and b are surface treated articles) parts by weight | | flame retardancy UL94 or oxygen index | thermal stability number of days | acid resistance grade | water-resistant insulating properties Ω · cm | tensile strength at yield point kgf/mm$^2$ | silver streaking grade |
|---|---|---|---|---|---|---|---|---|
| Ex. 3 | a: A-III | 125 | oxygen index 38 | 25 | 1 | 2 × 10$^{14}$ | 1.69 | 2 |
| | b: B-III | 125 | | | | | | |
| C. Ex. 8 | a: A-III | 250 | 38 | 20 | 4 | 2 × 10$^{14}$ | 1.66 | 1 |
| C. Ex. 9 | b: B-III | 250 | 37.5 | 14 | 1 | 1 × 10$^{14}$ | 1.64 | 5 |
| C. Ex. 10 | a: X-III | 125 | 38 | 1 | 4 | 5 × 10$^{13}$ | 1.14 | 5 |
| | b: Y-III | 125 | | | | | | |
| Ex. 4 | a: A-I | 25 | ⅛-inch HB accepted | 60 | 1 | 2 × 10$^{15}$ | 2.38 | 1 |
| | b: B-I | 25 | | | | | | |
| | c: | 8 | | | | | | |
| | d: | 2 | | | | | | |
| C. Ex. 11 | a: X-I | 25 | accepted | 8 | 3 | 1 × 10$^{11}$ | 1.75 | 2 |
| | b: Y-I | 25 | | | | | | |
| | c: | 8 | | | | | | |
| | d: | 2 | | | | | | |
| C. Ex. 12 | a: A-I | 50 | accepted | 55 | 3 | 2 × 10$^{15}$ | 2.35 | 1 |
| | c: | 8 | | | | | | |
| | d: | 2 | | | | | | |
| C. Ex. 13 | b: B-I | 50 | accepted | 46 | 1 | 1 × 10$^{15}$ | 2.34 | 3 |
| | c: | 8 | | | | | | |
| | d: | 2 | | | | | | |

EXAMPLES 5 AND COMPARATIVE EXAMPLES 14 TO 16

The following resin compositions were prepared and experiments shown in Table 5 below were conducted. Magnesium hydroxide particles and aluminum hydroxide particles were used without subjecting to surface treatment.
100 parts by weight: ethylene-vinyl acetate copolymer (vinyl acetate content of 25%)
75 parts by weight: magnesium hydroxide particles; A-I, X-III
75 parts by weight: aluminum hydroxide particles; B-I, Y-III
3 parts by weight: zinc stearate
2 parts by weight: DCP (dicumyl peroxide)
1 part by weight: silane coupling agent (A-172 of Nippon Unica Co., Ltd.)
1 part by weight: Irganox 1010

Method of Preparing a Test Piece

Raw materials were kneaded by a single-screw kneading extruder at 120° C.

The resulting mixture was pre-molded by a compression molding machine at 120° C. for 5 minutes and crosslinked at 180° C. for 15 minutes to obtain 2 mm thick and ⅛-inch thick plates.

Test pieces were formed from the obtained plates for each test, and tests shown in Table 5 were carried out on these test pieces.

Thermal stability: A test piece having 25 mm in width and 50 mm in length was obtained from the 2 mm thick crosslinked plate and a thermal stability test was carried out in the same manner as in Example 1.

Tensile strength: A No. 2 test piece according to JIS K 7113 was obtained and measured at a test rate of 200 mm/min.

TABLE 5

|  | a: magnesium hydroxide<br>b: aluminum hydroxide | flame retardancy UL94 HB | thermal stability number of days | acid resistance grade | water-resistant isulating properties $\Omega \cdot cm$ | tensile strength at yield point kgf/mm$^2$ |
|---|---|---|---|---|---|---|
| Ex. 5 | a: A-I<br>b: B-I | accepted | 45 | 1 | $1 \times 10^{14}$ | 1.35 |
| C. Ex. 14 | a: X-III<br>b: Y-III | accepted | 2 | 5 | $1 \times 10^{9}$ | 0.85 |
| C. Ex. 15 | a: A-I | accepted | 41 | 5 | $1 \times 10^{14}$ | 1.33 |
| C. Ex. 16 | b: B-I | accepted | 35 | 1 | $5 \times 10^{13}$ | 1.34 |

EXAMPLE 6

The following resin compositions (1) to (3) were prepared, and test pieces were formed in the same manner as in Example 1 and evaluated for flame retardancy. As a result, the flame retardancy of all the 1/16-inch test pieces was V-0 according to the UL94VE method.

Resin composition (1)
100 parts by weight: nylon 12 (of an injection molding grade with a specific gravity of 1.02)
95 parts by weight: magnesium hydroxide particles of Example 3
95 parts by weight: aluminum hydroxide particles of Example 3
0.5 part by weight: antioxidant (Irganox 1098 of Ciba-Geigy Limited.)
(2)
100 parts by weight: high-density polyethylene
110 parts by weight: magnesium hydroxide particles of Example 1
110 parts by weight: aluminum hydroxide particles of Example 1
0.25 part by weight: antioxidant (Irganox 1010 of Ciba-Geigy Limited.)
1 part by weight: silicone resin powder (DC47081 of Toray Dow Corning Co., Ltd.)
(3)
80 parts by weight: PS resin (of an impact resistant grade having an MFI of 4 g/10 min)
10 parts by weight: nylon 12 (of an injection molding grade with a specific gravity of 1.02)
10 parts by weight: SEB resin (Taftex M1943 of Asahi Chemical Industry Co., Ltd.)
50 parts by weight: magnesium hydroxide particles of Example 3
50 parts by weight: aluminum hydroxide particles of Example 3
10 parts by weight: red phosphorus (Nova Excel 140 of Rin Kagaku Co., Ltd.)
8 parts by weight: carbon black (FEF produced by oil furnace method)
0.5 part by weight: antioxidant (Irganox 1010 of Ciba-Geigy Limited.)

EXAMPLE 7

The following composition was prepared, roughly kneaded with an open roll at 70° C. and vulcanized at 160° C. of 30 minutes after one day to obtain a 1/8-inch thick plate. A 1/8-inch thick test piece for a UL94VE test was formed from the obtained plate. A UL94VE test was carried out on the test piece. According to the result of the test, the flame retardancy of the test piece was V-1.

Composition
100 parts by weight: EPDM rubber (ethylene/propylene ratio=50/50 moles)
85 parts by weight: magnesium hydroxide particles of Example 1
85 parts by weight: aluminum hydroxide particles of Example 1
3 parts by weight: dicumyl peroxide
0.5 part by weight: poly(2,2,4-trimethyl-1,2-dihydroquinoline)
1 part by weight: silane coupling agent (A-172 of Nippon Unica Co., Ltd.)
1 part by weight: stearic acid
1 part by weight: sulfur

EXAMPLE 8

The following composition was prepared, kneaded by a kneader at about 30° C. and cured at 90° C. for 15 minutes to obtain a 1/8-inch thick plate. A 1/8-inch thick test piece for a UL94VE test was formed from the obtained plate. A UL94VE test was carried out on this test piece. According to the result of the test, the flame retardancy of this test piece was V-0.

Composition
100 parts by weigh: epoxy resin (specific gravity of 1.17)
60 parts by weight: magnesium hydroxide particles of Example 1
60 parts by weight: aluminum hydroxide particles of Example 1
5 parts by weight: red phosphorus (Nova Excel 140 of Rin Kagaku Co., Ltd.)
1 part by weight: carbon black (FEF produced by oil furnace method)
10 parts by weight: curing agent (HY951 of Ciba-Geigy Limited)
3 parts by weight: stearic acid
0.2 part by weight: antioxidant (Irganox 1010 of Ciba-Geigy Limited)

Since magnesium hydroxide particles and aluminum hydroxide particles both having specified properties are used in combination in the present invention, there are provided an economical flame retardant resin composition having no problems with thermal stability, acid resistance, water-resistant insulating properties, mechanical strength and surface appearance and a molded article therefrom.

When the resin composition of the present invention is used, a molded article having no silver streaking on the surface can be provided by injection molding the resin composition at about 170 to 195° C.

What is claimed is:

1. A flame retardant resin composition which consists essentially of:
    (A) 100 parts by weight of a synthetic resin;
    (B) 20 to 150 parts by weight of magnesium hydroxide particles; and
    (C) 20 to 150 parts by weight of aluminum hydroxide particles,
        wherein the magnesium hydroxide particles and the aluminum hydroxide particles satisfy the following conditions (i) to (v) respectively:
            (i) the average secondary particle diameter measured by a microtrack method is 0.4 to 4 μm;
            (ii) the specific surface measured by a BET method is 1 to 15 m$^2$/g;
            (iii) the total content of an iron compound and a manganese compound is 200 ppm or less in terms of metals [Fe+Mn];
            (iv) the ratio of the specific surface measured by the BET method to the specific surface measured by a Blaine method is 1 to 4; and
            (v) the content of a water-soluble sodium salt is 500 ppm or less in terms of metal sodium.

2. The flame retardant resin composition of claim 1 which consists essentially of (A) 100 parts by weight of a synthetic resin, (B) 25 to 125 parts by weight of magnesium hydroxide particles and (C) 25 to 125 parts by weight of aluminum hydroxide particles.

3. The flame retardant resin composition of claim 1, wherein the magnesium hydroxide particles and the aluminum hydroxide particles have an average secondary particle diameter, measured by the microtrack method, of 0.6 to 1.5 μm, respectively.

4. The flame retardant resin composition of claim 1, wherein the magnesium hydroxide particles and the aluminum hydroxide particles have a specific surface measured by the BET method, of 3 to 10 m$^2$/g, respectively.

5. The flame retardant resin composition of claim 1, wherein the magnesium hydroxide particles and the aluminum hydroxide particles have a ratio of the specific surface measured by the BET method to the specific surface measured by the Blaine method of 1 to 3, respectively.

6. The flame retardant resin composition of claim 1, wherein the magnesium hydroxide particles and the aluminum hydroxide particles have a total content of iron, manganese, cobalt, chromium, copper, vanadium and nickel compounds of 200 ppm or less in terms of metals, respectively.

7. The flame retardant resin composition of claim 1, wherein the magnesium hydroxide particles and the aluminum hydroxide particles have a total content of iron and manganese compounds of 100 ppm or less in terms of metals (Fe+Mn), respectively.

8. The flame retardant resin composition of claim 1, wherein the magnesium hydroxide particles and the aluminum hydroxide particles have a water-soluble sodium salt content of 300 ppm or less in terms of metal sodium, respectively.

9. The flame retardant resin composition of claim 1, wherein the magnesium hydroxide particles are treated with at least one surface treating agent selected from the group consisting of higher fatty acids, titanate coupling agents, silane coupling agents, aluminate coupling agents and alcohol phosphoric esters.

10. The flame retardant resin composition of claim 1, wherein the aluminum hydroxide particles are treated with at least one surface treating agent selected from the group consisting of higher fatty acids, titanate coupling agents, silane coupling agents, aluminate coupling agents and alcohol phosphoric esters.

11. The flame retardant resin composition of claim 1 which contains at least one retardant aid selected from the group consisting of red phosphorus powder, silicone and carbon powder in an amount of 0.1 to 30 parts by weight based on 100 parts by weight of the synthetic resin.

12. The flame retardant resin composition of claim 1, wherein the surface of the magnesium hydroxide particle is coated with at least one acid resistant coating agent selected from the group consisting of silicon compounds, boron compounds and aluminum compounds.

13. The flame retardant resin composition of claim 1, wherein the synthetic resin is a polyolefin or a copolymer thereof.

14. The flame retardant resin composition of claim 1 which is rated to have a flame retardancy grade of V-0 according to the flame retardant rating of the UL94VE method.

15. A molded article of the flame retardant resin composition of claim 1.

16. A process for producing a flame retardant resin molded article comprising the step of injection molding the flame retardant resin composition of claim 1 at a temperature of 200° C. or lower.

17. A flame retardant resin composition which consists essentially of:
    (A) 100 parts by weight of a synthetic resin;
    (B) 25 to 125 parts by weight of magnesium hydroxide particles; and
    (C) 25 to 125 parts by weight of aluminum hydroxide particles,
        wherein the magnesium hydroxide particles and the aluminum hydroxide particles satisfy the following conditions (i) to (v) respectively:
            (i) the average secondary particle diameter measured by a microtrack method is 0.6 to 1.5 μm;
            (ii) the specific surface measured by a BET method is 3 to 10 m$^2$/g;
            (iii) the total content of an iron compound and a manganese compound is 200 ppm or less in terms of metals (Fe+Mn);
            (iv) the ratio of the specific surface measured by the BET method to the specific surface measured by a Blaine method is 1 to 3; and
            (v) the content of the water-soluble sodium salt is 300 ppm or less in terms of metal sodium.

18. The flame retardant resin composition of claim 17, wherein the magnesium hydroxide particles and the aluminum hydroxide particles have a total content of iron, manganese, cobalt, chromium, copper, vanadium and nickel compounds of 200 ppm or less in terms of metals, respectively.

19. The flame retardant resin composition of claim 17, wherein the magnesium hydroxide particles and the aluminum hydroxide particles have a total content of iron and manganese compounds of 100 ppm or less in terms of metals (Fe+Mn), respectively.

20. The flame retardant resin composition of claim 17, wherein the magnesium hydroxide particles and the aluminum hydroxide particles are treated with at least one surface treating agent selected from the group consisting of higher fatty acids, titanate coupling agents, silane coupling agents, aluminate coupling agents and alcohol phosphoric esters.

* * * * *